United States Patent

Matsumoto et al.

[11] Patent Number: 5,933,821
[45] Date of Patent: Aug. 3, 1999

[54] METHOD AND APPARATUS FOR DETECTING CAUSALITY

[75] Inventors: Kazunori Matsumoto; Kazuo Hashimoto, both of Saitama, Japan

[73] Assignee: Kokusai Denshin Denwa Co., Ltd, Tokyo, Japan

[21] Appl. No.: 08/919,449

[22] Filed: Aug. 28, 1997

[30] Foreign Application Priority Data

Aug. 30, 1996 [JP] Japan .................................. 8-246808

[51] Int. Cl.⁶ ................................................. G06F 17/30
[52] U.S. Cl. ...................... 707/1; 707/6; 707/7; 707/201; 707/202
[58] Field of Search .................................. 707/6, 7, 512, 707/1, 2, 3, 4, 5, 201, 202; 705/7; 273/257

[56] References Cited

U.S. PATENT DOCUMENTS

| | | | |
|---|---|---|---|
| 4,299,390 | 11/1981 | Delgado | 273/257 |
| 5,661,666 | 8/1997 | Yemini et al. | 702/179 |
| 5,688,988 | 11/1997 | Chen et al. | 395/612 |
| 5,727,199 | 3/1998 | Chen et al. | 395/606 |
| 5,737,600 | 4/1998 | Geiner et al. | 395/616 |
| 5,764,975 | 6/1998 | Taniguchi et al. | 707/6 |
| 5,774,716 | 6/1998 | Harbinski et al. | 395/618 |
| 5,787,274 | 7/1998 | Agrawal et al. | 395/613 |
| 5,809,499 | 9/1998 | Wong et al. | 707/6 |
| 5,832,482 | 11/1998 | Yu et al. | 707/6 |

OTHER PUBLICATIONS

"Fast Algorithms for Mining Association Rules", Rakesh Agrawal et al., 20th VLDB, pp. 487–499 (1994).

Hand "Data Mining: Statistics and More?" The American Statistician, pp. 112–118, May 1998.

Studt "Scientific data miners make use of all the tools available" Research & Development, pp. 62C–62D, Apr. 1997.

Zaki et al. "A Localized Algorithm for Parallel Association Mining" SPAA 97, pp. 321–330, Jun. 1997.

Pequeno "Real–time fraud detection: Telecom's next big step" Telecommunications, pp. 59–64, May 1997.

Glymour et al. "Statistical inference and data mining" Association for Computing Machinery, Communications of the ACM, pp. 35–41, Nov. 1996.

Fukuda et al. "Mining Optimized Association Rules for Numeric Attributes", PODS'96 pp. 182–191, Feb. 1996.

*Primary Examiner*—Paul V. Kulik
*Assistant Examiner*—Michael Wallace
*Attorney, Agent, or Firm*—Nikaido Marmelstein Murray & Oram LLP

[57] ABSTRACT

A causality detection apparatus for detecting causality of events based upon a database provided with log of the events includes a sorter module for generating an event list by sorting in time sequence the events, and a frequency analysis module for calculating, based upon the event list, the number of appearance of an event set pair <X,Y> of a first event set $X(=\{e_{x1}, e_{x2}, \ldots, e_{xn}, \ldots\}$, $e_{xn}$ indicates an event and n is a natural number) and a second event set $Y(=\{e_{y1}, e_{y2}, \ldots, e_{yn}, \ldots\}$, $e_{yn}$ indicates an event), the number of appearance of the first event set X and the number of appearance of the second event set Y. The event set pair <X,Y> has co-occurrence so that the second event set Y occurs within a predetermined time period (window size W) after a time of occurrence of the first event set X. The apparatus further includes a causality detection module for detecting, based upon the number of appearance of the event set pair <X,Y>, upon the number of appearance of the first event set X and upon the number of appearance of the second event set Y, significance of causality caused by the first event set X to occur the second event set Y within the window size W.

24 Claims, 4 Drawing Sheets

METHOD AND APPARATUS FOR DETECTING CAUSALITY

FIELD OF THE INVENTION

The present invention relates to a method and apparatus for detecting causality in data mining technology for discovering useful information in a database. Particularly, the present invention relates to a causality detection method and apparatus for automatically detecting a set of events concerning cause and effect from the event log. The invention may be applied to fault management for forecasting a fault or for identifying the cause of a fault in accordance with the system log, and to identification of causality between the environment factor and the amount sold of each item in a field of sales promotion.

DESCRIPTION OF THE RELATED ART

As for a fundamental technology with respect to the problem of discovering causality from a database of event log, an algorithm for discovering association rules is described in R. Agrawal and R. Srikant, "Fast Algorithms for Mining Association Rules", 20th VLDB, pp.487–499, 1994.

This known algorithm for mining association rules first finds sets of items (itemsets) that have transaction support equal to or above a predetermined threshold (minimum support called as minsup) from a database in which each transaction is constituted by several itemsets, and then using the found itemsets to generate association rules that have confidence equal to or above a predetermined threshold (minimum confidence called as minconf).

The support and the confidence of the association rule $X \rightarrow Y$ (X and Y are itemsets) are defined as follows.

Support=(the number of transactions including $X \cup Y$)/(the number of all transactions)

Confidence=(the number of transactions including $X \cup Y$)/(the number of all transactions including X)

The following is the itemsets generation algorithm.

$L_1=\{1\text{-itemsets}\}$;
for (k=2; $L_{k-1} \neq 0$; k++) do begin
  $C_k$=apriori-gen($L_{k-1}$);
  forall transaction tr∈D do begin
  $C_{tr}$=subset($C_k$,tr);
  forall candidates c∈$C_{tr}$ do
    c.count++;
  end
  $L_k=\{c \in C_k|\ c.count \geq minsup\}$;
end
Answer=$\cup_k L_k$;

This algorithm is one for generating itemsets having supports more than or equal to the minimum support (minsup). In the algorithm, $L_k$ represents a set of k-itemsets with the minimum support (minsup), and $C_k$ represents a set of candidate k-itemsets. Each member of the sets has two fields of item set and support count.

As will be understood, the first pass of this algorithm simply counts item occurrences to determine the single-itemsets (1-itemsets) $L_1$. The subsequent pass k consists of two phases. First, the itemsets $L_{k-1}$ found in the (k-1)th pass are used to generate the candidate k-itemsets $C_k$ using the apriori-gen function described in the aforementioned reference. Then, the database D is scanned and the support of candidates in $C_k$ that are contained in a given transaction tr is counted. Thus, a set of candidates $C_{tr}$ is obtained, and for each candidate c contained in $C_{tr}$, a record of the number of appearance of the candidate c is incremented. After the above-mentioned process is executed for all the transactions, a set of candidates in $C_k$ that have the record of the number of appearance equal to or more than the minimum support (minsup) is determined to $L_k$. If $L_k$ is an empty set, a union of $L_1$ to $L_k$ is itemsets to be generated.

The following is an algorithm for mining an association rule that has a confidence equal to or more than the minimum confidence (minconf) from the itemsets generated by the above-mentioned itemsets generation algorithm.

Answer=0
forall I∈$\cup_k L_k$ do
  forall J∈ subset of I do
    if confidence of Rule "I-J→J">minconf then
      Answer=Answer ∪ "I-J→J";

In this algorithm, a partial set J is derived from each of the generated itemsets I and outputted when a confidence of the association rule "I-J→J" is equal to or more than the minimum confidence (minconf).

Such conventional algorithm for discovering association rules can detect co-occurrence of items within a single transaction, but cannot detect co-occurrence of items between different transactions. Thus, it is impossible to detect causality between an event contained in one transaction and an event contained in another transaction.

In order to detect co-occurrence of the events, calculation of frequency of appearance of each pair of events is necessary. However, the calculation of the frequency of appearance for event pairs with respect to all appeared events, that calculation is necessary for detecting the co-occurrence contained in the different transactions, will invite explosive increase in the number of combination of events.

In addition, according to the conventional algorithm, a threshold value concerning confidence of the rule such as the minimum confidence (minconf) is required. However, this minconf threshold has to be, in fact, determined by experienced operator in consideration of contents in the database.

SUMMARY OF THE INVENTION

It is therefore an object of the present invention to provide a method and apparatus for detecting causality, whereby causality can be derived by detecting co-occurrence between different transactions.

Another object of the present invention is to provide a method and apparatus for detecting causality, whereby necessary calculation of frequency of appearance with respect to a pair of events can be effectively executed without using a threshold value concerning confidence of the causality.

According to the present invention, a causality detection apparatus for detecting causality of events based upon a database provided with log of the events is provided. This apparatus includes a sorter module for generating an event list by sorting in time sequence the events, and a frequency analysis module for calculating, based upon the event list, the number of appearance of an event set pair <X,Y> of a first event set X $(=\{e_{x1},e_{x2},\ldots,e_{xn},\ldots\}$, $e_{xn}$ indicates an event and n is a natural number) and a second event set Y $(=\{e_{y1},e_{y2},\ldots,e_{yn},\ldots\}$, $e_{yn}$ indicates an event), the number of appearance of the first event set X and the number of appearance of the second event set Y. The event set pair <X,Y> has co-occurrence so that the second event set Y occurs within a predetermined time period (window size W) after a time of occurrence of the first event set X. The apparatus further includes a causality detection module for detecting, based upon the number of appearance of the event set pair <X,Y>, upon the number of appearance of the first event set X and upon the number of appearance of the second event set Y, significance of causality caused by the first event set X to occur the second event set Y within the window size W.

Also according to the present invention, a causality detection apparatus for detecting causality of events based upon a database provided with log of the events is provided. This apparatus includes a sorter module for generating an event list by sorting in time sequence the events, and a frequency analysis module for calculating, based upon the event list, the number of appearance of an event pair $<e_x,e_y>$ of a first event $e_x$ and a second event $e_y$, the number of appearance of the first event $e_x$ and the number of appearance of the second event $e_y$. The event pair $<e_x,e_y>$ has co-occurrence so that the second event set $e_y$ occurs within a predetermined time period (window size W) after a time of occurrence of the first event set $e_x$. The apparatus further includes a causality detection module for detecting, based upon the number of appearance of the event pair $<e_x,e_y>$, upon the number of appearance of the first event $e_x$ and upon the number of appearance of the second event $e_y$, significance of causality caused by the first event $e_x$ to occur the second event $e_y$ within the window size W.

According to the present invention, furthermore, a causality detection method of detecting causality of events based upon a database provided with log of the events is provided. This method includes a sorting step of generating an event list by sorting in time sequence the events, and a frequency analysis step of calculating, based upon the event list, the number of appearance of an event set pair $<X,Y>$ of a first event set $X (=\{e_{x1},e_{x2}, \ldots ,e_{xn}, \ldots\}$, $e_{xn}$ indicates an event and n is a natural number) and a second event set $Y (=\{e_{y1},e_{y2}, \ldots e_{yn}, \ldots\}$, $e_{yn}$ indicates an event), the number of appearance of the first event set X and the number of appearance of the second event set Y. The event set pair $<X,Y>$ has co-occurrence so that the second event set Y occurs within a predetermined time period (window size W) after a time of occurrence of the first event set X. The method further includes a causality detection step of detecting, based upon the number of appearance of the event set pair $<X,Y>$, upon the number of appearance of the first event set X and upon the number of appearance of the second event set Y, significance of causality caused by the first event set X to occur the second event set Y within the window size W.

Also according to the present invention, a causality detection method of detecting causality of events based upon a database provided with log of the events is provided. This method includes a sorting step of generating an event list by sorting in time sequence the events, and a frequency analysis step of calculating, based upon the event list, the number of appearance of an event pair $<e_x,e_y>$ of a first event $e_x$ and a second event $e_y$, the number of appearance of the first event $e_x$ and the number of appearance of the second event $e_y$. The event pair $<e_x,e_y>$ has co-occurrence so that the second event set $e_y$ occurs within a predetermined time period (window size W) after a time of occurrence of the first event set $e_x$. The method further includes a causality detection step of detecting, based upon the number of appearance of the event pair $<e_x,e_y>$, upon the number of appearance of the first event $e_x$ and upon the number of appearance of the second event $e_y$, significance of causality caused by the first event $e_x$ to occur the second event $e_y$ within the window size W.

It is preferred that the numbers are calculated during intermediate period between a time of occurrence of the first event set X or the first event $e_x$ and a time of occurrence of the second event set Y or the second event $e_y$ when none of the first and second event sets X and Y or none of the first and second events $e_x$ and $e_y$ is occurring.

It is also preferred that, with respect to each event set pair $<X,Y>$ or each event pair $<e_x,e_y>$, the values of information criteria of two models based upon log likelihoods of the models and upon the number of parameters used in the models, one of the models postulating the existence of causality and the other one of the models postulating no existence of causality are calculated, and significance of causality is detected by comparing the calculated values of information criteria. Thus, necessary calculation of frequency of appearance with respect to event set pair or event pair can be effectively executed without using parameters concerning confidence of the causality.

In this case, it is preferably decided that there exists significance of causality when the calculated value of information criteria of the model which postulates the existence of causality is smaller than the calculated value of information criteria of the model which postulates no existence of causality.

It is also preferred that a local list which is a part of the event list is generated, and then an event list is provides by updating in inverse time sequence the local list.

It is preferred that the number of appearance of an event set pair $<X,Y>$ or an event pair $<e_x,e_y>$ of a first event set $X (=\{e_{x1},e_{x2}, \ldots ,e_{xn}, \ldots\}$, $e_{xn}$ indicates an event and n is a natural number) or a first event $e_x$ occurred at a time $t_i$ (i is an integer equal to or more than 0) and a second event set $Y (=\{e_{y1},e_{y2}, \ldots ,e_{yn}, \ldots\}$, $e_{yn}$ indicates an event) or a second event $e_y$ occurred at a time $t_k$ ($t_i<t_k<t_i+w$, i and k are integers equal to or more than 0, w is the predetermined time period) in the event list is calculated. The event set pair $<X,Y>$ or the event pair $<e_x,e_y>$ satisfies a sequence condition of $\forall e_x \in X$, $e_y \in Y$, $e_z \in Z$, $e_x \neq e_z$ and $e_y \neq e_z$ with respect to the first event set X or the first event $e_x$, the second event set Y or the second event $e_y$ and a third event set $Z (=\{e_{z1},e_{z2}, \ldots ,e_{zn}, \ldots\}$, $e_{zn}$ indicates an event) or a third event $e_z$ occurred at an optional time $t_j$ which satisfies $t_i<t_j<t_k$ (j is an integer equal to or more than 0). The calculation of the number of appearance of the event set pair $<X,Y>$ or the event pair $<e_x,e_y>$ is executed by updating a set of events $NB_q$ occurred between a time $t_{p+1}$ and a time $t_q$ ($p<q \leq m(p)$, m(p) is a natural number), and by updating a set of events $H_q$ which satisfy the sequence condition and are contained in a fourth event set $E' (=\{e_{e1},e_{e2}, \ldots ,e_{en}, \ldots\}$, $e_{en}$ indicates an event) or a fourth event $e_e$ occurred at a time $t_q$ (p<q<m (p)) and in optional events at the time $t_{p+1}$, with updating a local list which is a part of the event list (event list at times $t_p,t_{p+1}, \ldots t_{m(p)}$, $t_{m(p)}<t_p+w<t_{m(p)+1}$). Thus, the number of appearance of the event set pair $<X,Y>$ or the event pair $<e_x,e_y>$ can be effectively obtained.

Further objects and advantages of the present invention will be apparent from the following description of the preferred embodiments of the invention as illustrated in the accompanying drawings.

DESCRIPTION OF THE PREFERRED EMBODIMENTS

Suppose that E represents a set of all events and T represents a time at which the last event occurred. A set of events $E_i=\{e_{i1}, e_{i2}, \ldots\}$ ($E_i \subseteq E$) occurred at a time $t_i$ ($0 \leq i \leq T$) or occurred within a predetermined time period before and after the time $t_i$ are called as a transaction. Even if each of the events in the transaction occurs for a time period, the events in the different transactions will not occur to overlap with each other.

If an event $e_x$ occurred at a time $t_i$ and an event $e_y$ occurred at a time $t_k$ ($t_i < t_k \leq t_i + w$, where w is the maximum value of elapsed time between cause and result (window size)) satisfy the following conditions, there is the possibility that causality from $e_x$ to $e_y$ may exist. This causality is expressed by $C_w(e_x, e_y)$.

$e_x \neq e_z$ and $e_y \neq e_z$, where $e_z$ is an event occurred at a time $t_j$ ($t_i < t_j < t_k$).

Hereinafter, the causality rule that "the event $e_x$ occurred at a time $t_i$ causes the occurrence of the event $e_y$ at a time $t_k$ ($t_i < t_k \leq t_i + w$)" is indicated by the following expression.

$$e_x \rightarrow e_y \quad (e_x, e_y \in E, e_x \neq e_y)$$

In order to discover this causality rule, according to the present invention, the number of appearance of all candidates which have the possibility of causality is detected and a stochastic test is used for confirming whether the causality rule is correct. The number of appearance of event pair <x,y> under the condition of $Cw(e_x, e_y)$ and the number of appearance of the event x are indicated as $n_1(x,y)$ and $n(x)$, respectively. In this case, x is called as a body and y is called as a head.

Figure 1:
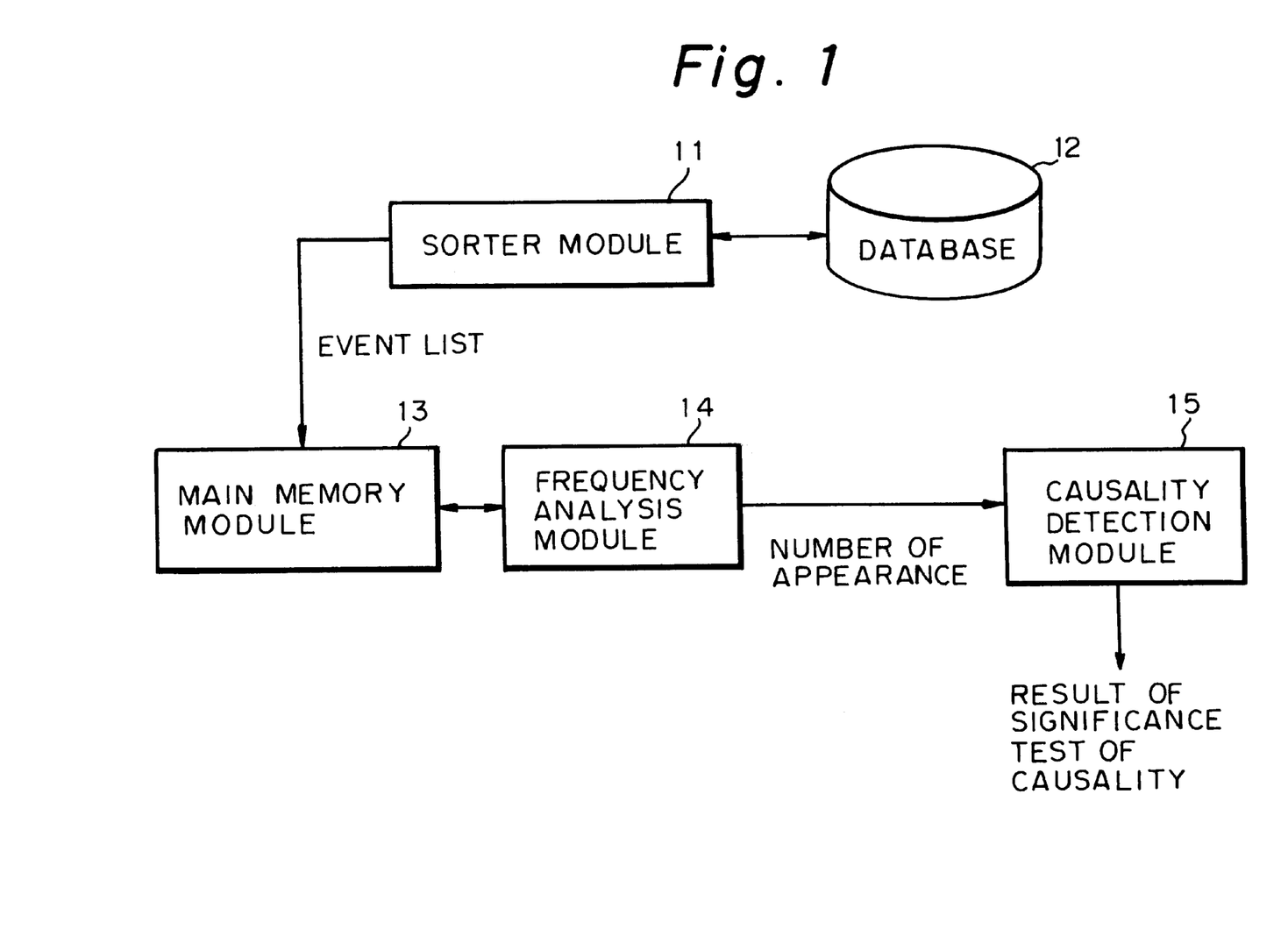
FIG. 1 is a block diagram showing a basic constitution of a causality detection apparatus according to the present invention.
Figure 2:
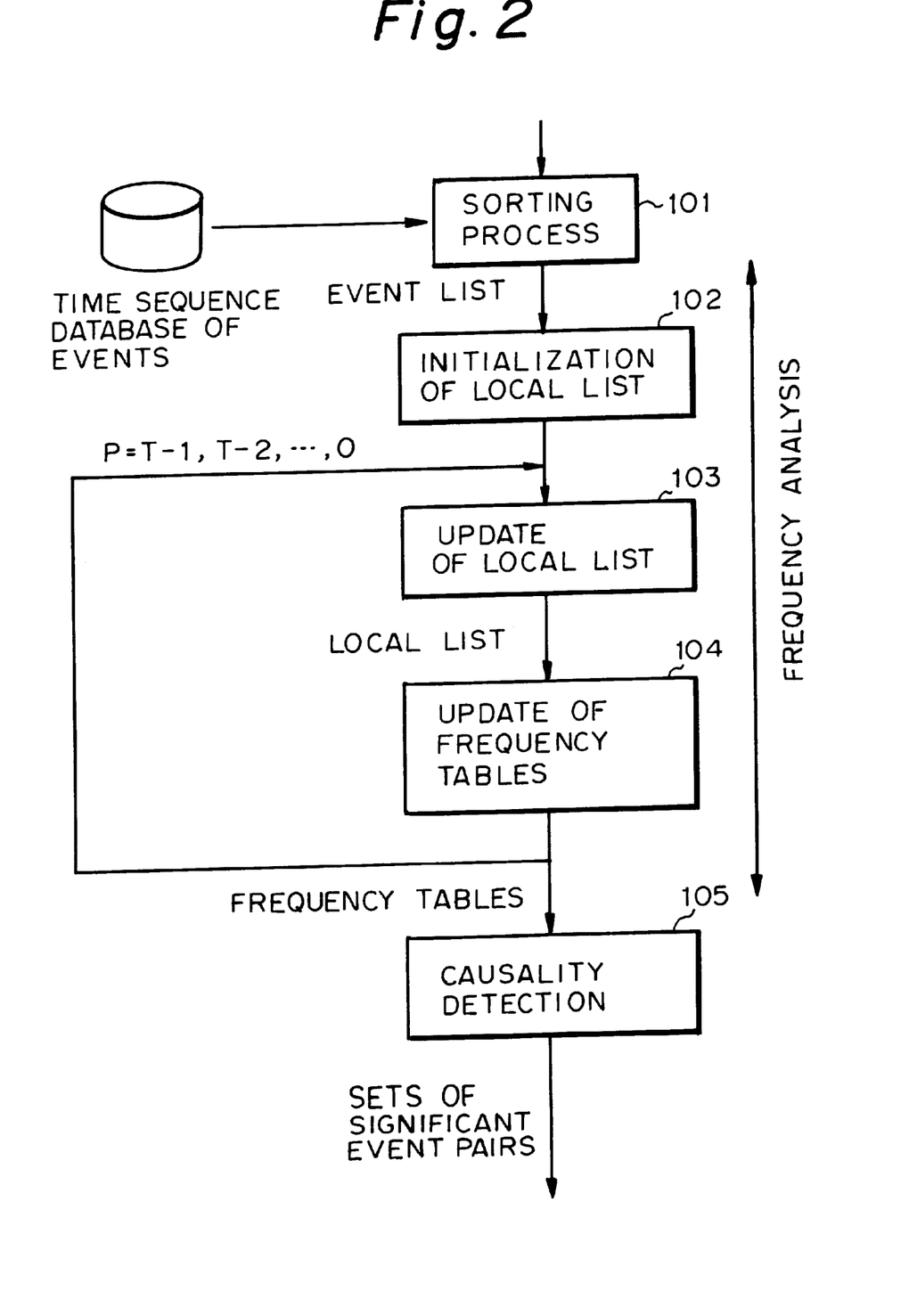
FIG. 2 is a flow chart illustrating an algorithm for detecting causality according to the apparatus shown in FIG. 1.

FIG. 1 is a block diagram showing a basic constitution of a causality detection apparatus according to the present invention, and FIG. 2 is a flow chart illustrating an algorithm for detecting causality according to the apparatus of FIG. 1. The following is detection processes of the causality.

At a sorter module 11, an event list in which transactions are arranged in time sequence is produced from sequential data of events stored in a database 12 (step 101). This sorter module 11 can be realized by means of for example typical database control functions. The produced event list is, as shown in Table 1, a list of event sets $E_1$ to $E_T$ at time $t_1$ to $t_T$.

TABLE 1

EVENT LIST

| TIME | SET OF EVENTS |
|---|---|
| $t_1$ | $E_1 = \{e_{11}, e_{12}, e_{13}, \ldots\}$ |
| $t_2$ | $E_2 = \{e_{21}, e_{22}, e_{23}, \ldots\}$ |
| $t_3$ | $E_3 = \{e_{31}, e_{32}, e_{33}, \ldots\}$ |
| $t_\tau$ | $E_\tau = \{e_{\tau 1}, e_{\tau 2}, e_{\tau 3}, \ldots\}$ |

If this event list is too large, it is impossible to store all the event list in a main memory module 13 in a computer, just as they are. To solve this problem, according to the present invention, a local list in which a part of the transactions in the event list, occurred within a window size W from a certain time $t_p$, are arranged in time sequence is produced and stored in the main memory module 13 (step 102). The produced local list is, as shown in Table 2, a list of event sets $E_p$ to $E_{p+m(p)}$ at time $t_p$ to $t_{p+m(p)}$.

TABLE 2

LOCAL LIST

| TIME | SET OF EVENTS |
|---|---|
| $t_p$ | $E_p = \{e_{p1}, e_{p2}, e_{p3}, \ldots\}$ |
| $t_{p+1}$ | $E_{p+1} = \{e_{(p+1)1}, e_{(p+1)2}, e_{(p+1)3}, \ldots\}$ |
| $t_{p+2}$ | $E_{p+2} = \{e_{(p+2)1}, e_{(p+2)2}, e_{(p+2)3}, \ldots\}$ |
| $t_{p+m(p)}$ | $E_{p+m(p)} = e_{(p+m(p))1}, e_{(p+m(p))2}, e_{(p+m(p))3}, \ldots\}$ |

Then, all data in the event list are scanned with updating the time of the top transaction and the time of the last transaction (step 103). It is important that the update of the local list is to be executed in inverse time sequence from the last time $t_T$. A frequency analysis module 14 updates two kinds of frequency tables shown as Tables 3 and 4 with updating the local list (step 104). The frequency table of Table 3 records the number of appearance of each event in the event list and the frequency table of Table 4 records the number of appearance of each event pair.

TABLE 3

FREQUENCY TABLE

| EVENT | THE NUMBER OF APPEARANCE |
|---|---|
| x | n (x) |
| y | n (y) |

TABLE 4

FREQUENCY TABLE

| PAIR OF EVENT | THE NUMBER OF APPEARANCE |
|---|---|
| (x, y) | $n_1$ (x, y) |
| (x', y') | $n_1$ (x', y') |

Following is a frequency analysis algorithm executed in the frequency analysis module 14.

```
NB_T=E_T;
H_T=E_T;
LocalList=E_T;
for p=T-1,T-2, . . . ,0 / inverse sequence / {
    NB_p=E_p;
    H_p=E_p;
    LocalList=LocalList+E_p-(eventsets after time (t_p+w)
                                        in LocalList);
    forall e_x ∈E_p do
        increment of n(e_x);
    for q=1,2,3, . . . ,m(p)   {
        H_{p+q}=H_{p+q}-E_p;
        forall e_x ∈E_p-NB_{p+q}
            forall e_y ∈H_{p+q}
                increment of n_p(e_x, e_y)
        NB_{p+q}=NB_{p+q}∪E_p;
    }
}
``` where $NB_q$ represents a set of events appeared in transactions from a time $t_{p+1}$ to a time $t_q$ (q>p). This event set $NB_q$ has an attribute of "in case that an event x at a time $t_p$ is the body and an event y at a time $t_q$ is the head, if $x \in NB_q$, no causality $C_w(x,y)$ exists". $H_q$ represents a set of events y with a causality $C_w(x,y)$ in case that a certain event at a time $t_{p+1}$ is the body and an event at a time $t_p$ is head. This event set $H_q$ has an attribute of "in case that the body is an event x' at a time $t_p$ and the head is an event y' at a time $t_q$, if x' $H_p$-$E_p$, a causality $C_w(x',y)$ exists". Furthermore, m(p) represents a number which is less than the number of transactions in the local list by one. Therefore, the last time appeared in the local list will be $t_{p+m(p)}$.

As aforementioned, the calculation is executed by updating the local list in inverse time sequence (p=T-1,T-2, . . . ,0). Therefore, $NB_q$ and $H_q$ will be already known at the time $t_p$ causing the calculation to be partially omitted. As a result, the number of appearance can be efficiently obtained.

A causality detection module 15 detects whether there is a causality or not in each of all the event pairs appeared in the frequency table (Table 4) by using a stochastic test strategy. In order to detect the causality of the event pair <x,y>, following four parameters $n_1$, $n_2$, $n_3$ and $n_4$ are used:

$n_1$ is the number of transactions including events x with $C_w(x,y)$;

$n_2$ is the number of transactions excluding events y with $C_w(x,y)$ and also including events x;

$n_3$ is the number of transactions excluding events x with $C_w(x,y)$ and also including events y; and $n_4$ is the number of transactions excluding events y nor events x.

These numbers $n_1$, $n_2$, $n_3$ and $n_4$ are calculated from following equations, where $n_1(x,y)$ is obtained from the frequency table (Table 4), n(x) is obtained from the frequency table (Table 3), and the number of all transactions is obtained by using database functions or by counting the transactions when the local list is updated.

$n_1=n_1(x,y)$
$n_2=n(x)-n_1(x,y)$
$n_3=n(y)-n_1(x,y)$
$n_4=$(the number of all transactions)$-(n_1,n_2,n_3,n_4)$ The stochastic test of the causality is executed by calculating both the value of information criteria $I_1$ based upon a model which postulates the existence of causality and the value of information criteria $I_2$ based upon a model which postulates no existence of causality, and by determining that the current event pair <x,y> has a causality if the model postulating the existence of causality is more appropriate than the other model.

The value of information criteria can be calculated by using Akaike's information criteria (AIC) or Baze's information criteria (BIC). The causality detection algorithm using AIC is described as follows.

$$\forall x \in E$$
$$\forall y \in E - \{x\} \{$$
$$\text{calculation of } I_2$$
$$\text{calculation of } I_1$$
$$\text{if } I_2 > I_1 \text{ then}$$
$$\text{output of } x \overset{w}{\Rightarrow} y$$
$$\}$$

The value of information criteria $I_1$ is calculated from log likelihood $MLL_1$ where the existence of causality is postulated, and the value of information criteria $I_2$ is calculated from log likelihood $MLL_2$ where no existence of causality is postulated. Followings are equations for calculating the value of information criteria $I_1$ and $I_2$.

$$MLL_1 = \sum_{i=1}^{4} n_i \log n_i - N\log N$$

$$I_1 = -2 \times MLL_1 + 2 \times 3$$

$$MLL_2 = (n_1 + n_2)\log(n_1 + n_2) +$$
$$(n_1 + n_3)\log(n_1 + n_3) +$$
$$(n_3 + n_4)\log(n_3 + n_4) +$$
$$(n_2 + n_4)\log(n_2 + n_4) -$$
$$2N\log N$$

$$I_2 = -2 \times MLL_2 + 2 \times 2$$

where $N = n_1 + n_2 + n_3 + n_4$.

Free parameters are three of $n_1$, $n_2$ and $n_3$ when there exists a causality, whereas free parameters are two of a ratio of $n_1$ and $n_2$ and a ratio of $n_1$ and $n_3$ when there exists no causality. As described in the causality detection algorithm using AIC, if the value of information criteria $I_1$ is less than the value of information criteria $I_2$, it is judged that there exists a causality.

Hereinafter, the experiment result of performance evaluation by means of the aforementioned stochastic test with respect to causality of log data obtained by a simulation will be described.

As for a simulation which will generate a related event (result) when a time period depending upon Gaussian distribution is elapsed after a particular event (cause) is generated from an event generation source under the Poisson process, an event occurrence model (FIG. 3) with the following characteristics is considered.

Figure 3:
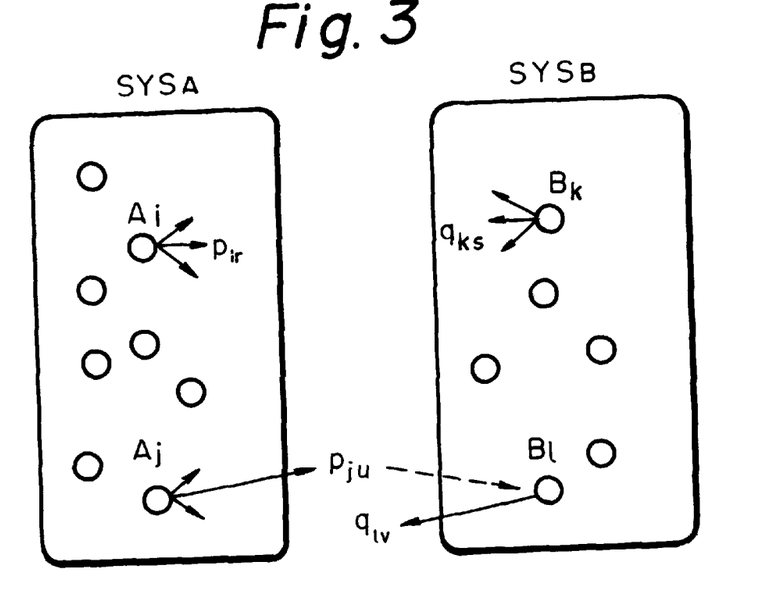
FIG. 3 shows a model of event occurrence used for performance evaluation in a stochastic test according to the present invention.

(1) A system $SYS_A$ has symbol generation sources $A_1$, $A_2$, . . . , $A_N$ and a system $SYS_B$ has symbol generation sources $B_1$, $B_2$, . . . , $B_N$ (N=10,000).

(2) The source $A_i$ generates symbols $p_{i1}$, $p_{i2}$, . . . , and the source $B_j$ generates symbols $q_{j1}$, $q_{j2}$, . . . . The number of the occurred symbols is pursuant to the binomial distribution B(n,p), where n=10, p=0.7.

(3) c symbol generation sources within the $SYS_A$ are selected at random (c=1,000). Each of the selected symbol generation sources will generate additional symbols other than the symbols defined in (2). The number of the additional symbols is pursuant to the binomial distribution $B(c_1, p_{c1})$, where $c_1=5$, $p_{c1}=0.7$.

(4) An interval between symbol occurrences in $A_i$ is pursuant to the Poisson distribution $P(\lambda_i)$. This $\lambda_i$ is pursuant to the Gaussian distribution $N(\mu, \sigma)$, where $\mu=3,600$, $\sigma=720$. An interval between symbol occurrences of the sources in $SYS_B$ is similarly determined.

(5) Suppose a causality that a particular symbol $q_{iv}$ is occurred from a particular symbol generation source $B_l$ in $SYS_B$ when the additional symbol defined in (3) is occurred from $A_j$ as $p_{ju}$. The time interval between the generations of $p_{ju}$ and $q_{iv}$ is pursuant to the Gaussian distribution $N(10,1)$.

The simulator provides time series symbols generated from the systems $SYS_A$ and $SYS_B$ as log data, and also provides a correspondence table between the symbols with the a causality, such as $p_{ju}$ and $q_{iv}$, as verification data. In the log data, which system did each symbol generate is indicated, but which information source did the symbol generate and also whether there exists a causality are not indicated.

The number of combinations of events occurring within a predetermined period of time will be very large. Thus, in order to decrease a large number of candidate rules, decision of no causality (rejection test) between the event pair is executed. Following items are measured as for evaluation items:

the number of rules to be rejection-tested, and
the number of remaining rules without rejection.

It is important that the remaining rules without rejection have good quality. Thus, following items are measured with respect to the remaining rules:

a miss detection ratio; a ratio of the number of candidates which in fact have causality but were not decided as causality rules with respect to the number of all causalities; and a fault detection ratio; a ratio of the number of causality rules which in fact do not have causality but were not rejected with respect to the number of all causality rules.

Figure 4:
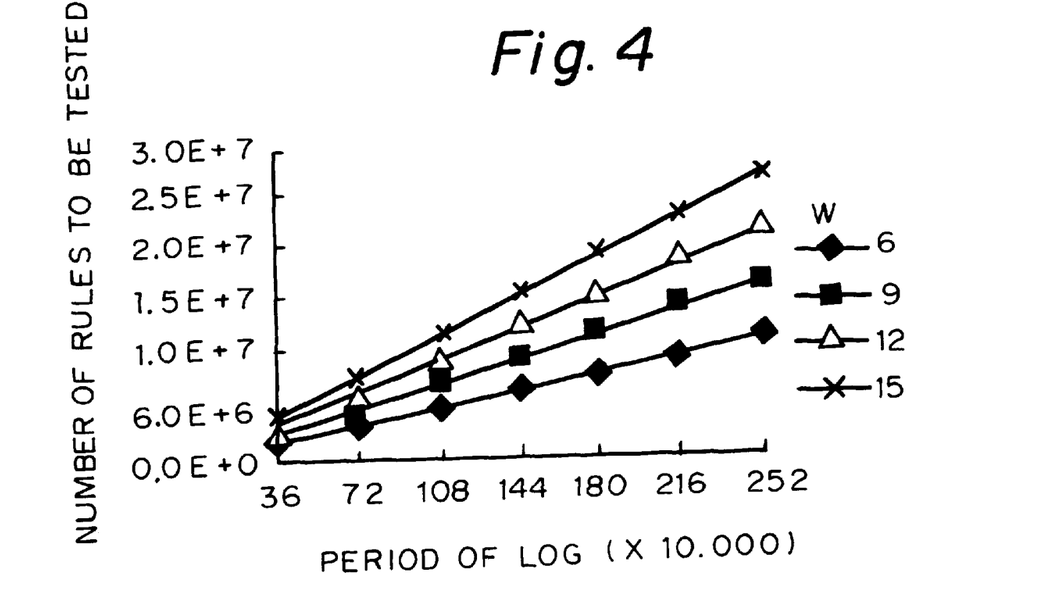
FIG. 4 illustrates relationship of the number of rules to be tested with respect to period of log data.
Figure 5:
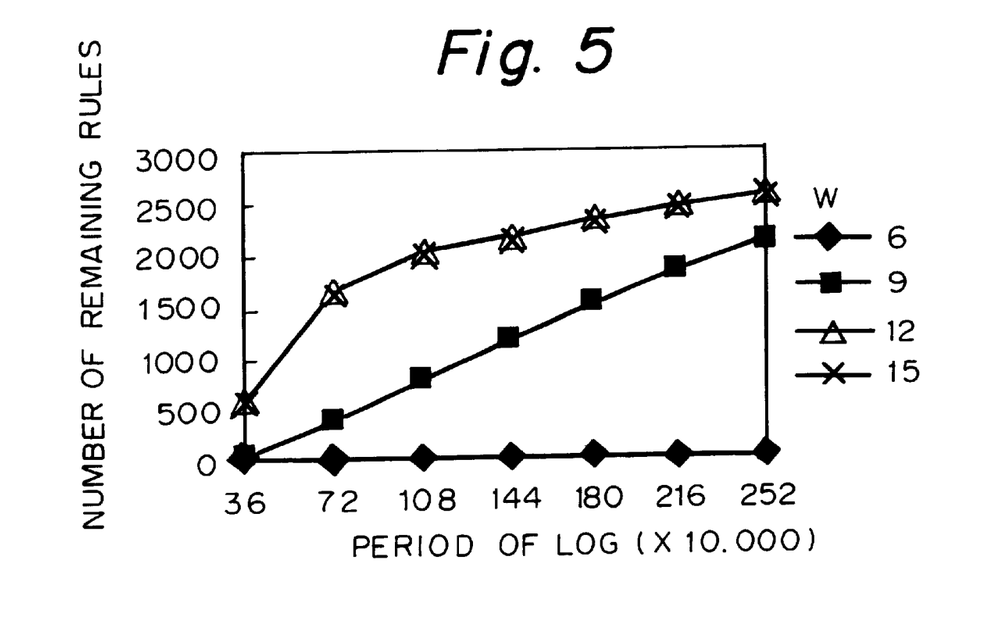
FIG. 5 illustrates relationship of the number of the remaining rules with respect to period of log data.

The number of rules to be rejection-tested and the number of remaining rules without rejection depend upon the window size W and upon time period of the log data. FIG. 4 illustrates relationship of the number of rules to be tested with respect to time period of the log data, and FIG. 5 illustrates relationship of the number of the remaining rules with respect to time period of the log data. As will be understood from these figures, according to the above-mentioned stochastic test, extremely many candidate rules can be rejected. In the simulation, since the time interval between the events having causality is determined to N(10, 1), any correct rule will be hardly discovered at W=6 which is smaller than the average interval by 4σ and also a correct rule which was not discovered at W=12 will be hardly discovered at W=15. Therefore, according to a proper rejection test, all rules will be rejected at W=6 and the number of remaining rules at W=12 will coincide with that at W=15. FIG. 5 shows such proper characteristics.

Figure 6:
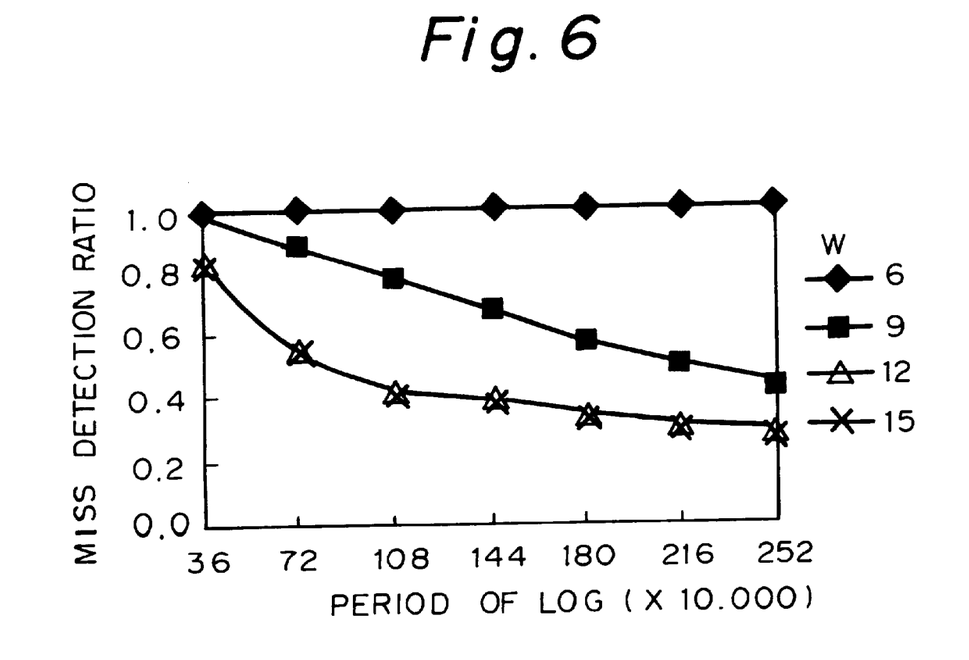
FIG. 6 illustrates relationship of miss detection ratio with respect to period of log data.

FIG. 6 illustrates relationship of a miss detection ratio with respect to time period of the log data. As will be understood from the figure, the longer the time period of the log data, the smaller the miss detection ratio (monotone decreasing). This characteristics indicates that co-occurrence with low frequency of appearance can be easily detected if the time period of log is long.

A fault detection ratio is always zero in the experiment embodiment (all candidates having no causality are rejected). Since this stochastic test of causality can reject a large number of rules and has a very low fault detection ratio, it will be verified that this stochastic test has a proper rejection ability with respect to incorrect rules.

The present invention is applicable to detect causality in data mining technology for discovering useful information in a database. For example, the present invention can be utilized in fault management for forecasting a fault or for identifying the cause of a fault in accordance with the system log, and in identification of causality between the environment factor and the amount sold of each item in a field of sales promotion.

Many widely different embodiments of the present invention may be constructed without departing from the spirit and scope of the present invention. It should be understood that the present invention is not limited to the specific embodiments described in the specification, except as defined in the appended claims.

What is claimed is:

1. A causality detection apparatus for detecting causality of events based upon a database provided with log of the events, comprising:

a sorter means for generating an event list by sorting in time sequence the events;

a frequency analysis means for calculating, based upon said event list, the number of appearances of an event set pair of a first event set and a second event set, the number of appearances of said first event set and the number of appearances of said second event set, said second event set occurring within a predetermined time period after a time of occurrence of said first event set; and a causality detection means for detecting, based upon the number of appearances of said event set pair, upon the number of appearances of said first event set and upon the number of appearances of said second event set, significance of causality caused by said first event and said second event set occuring within said predetermined time period.

2. The apparatus as claimed in claim 1, wherein said frequency analysis means includes means for calculating said numbers during intermediate period between a time of occurrence of said first event set and a time of occurrence of said second event set when none of said first and second event sets is occurring.

3. The apparatus as claimed in claim 1, wherein said causality detection means includes means for calculating, with respect to each event set pair, the values of information criteria of two models based upon log likelihoods of the models and upon the number of parameters used in the models, one of said models postulating the existence of causality and the other one of said models postulating no existence of causality, and decision means for detecting significance of causality by comparing the calculated values of information criteria.

4. The apparatus as claimed in claim 3, wherein said decision means decides that there exists significance of causality when the calculated value of information criteria of the model which postulates the existence of causality is smaller than the calculated value of information criteria of the model which postulates no existence of causality.

5. The apparatus as claimed in claim 1, wherein said sorter means includes means for generating a local list which is a part of said event list, and means for generating an event list by updating in inverse time sequence said local list.

6. The apparatus as claimed in claim 1, wherein said frequency analysis means includes means for calculating the number of appearance of an event set pair <X,Y> of a first event set $X(=\{e_{x1},e_{x2},\ldots,e_{xn},\ldots\}$, $e_{xn}$ indicates an event and n is a natural number) occurred at a time $t_i$ (i is an integer equal to or more than 0) and a second event set $Y(=\{e_{y1},e_{y2},\ldots,e_{yn},\ldots\}$, $e_{yn}$ indicates an event) occurred at a time $t_k$ ($t_i<t_k<t_i+w$, i and k are integers equal to or more than 0, w is said predetermined time period) in said event list, said event set pair <X,Y> satisfying a sequence condition of $\forall e_x \in X$, $e_y \in Y$, $e_z \in Z$, $e_x \neq e_z$ and $e_y \neq e_z$ with respect to said first event set X, said second event set Y and a third event set $Z(=\{e_{z1},e_{z2},\ldots,e_{zn},\ldots\}$, $e_{zn}$ indicates an event) occurred at an optional time $t_j$ which satisfies $t_i<t_j<t_k$ (j is an integer equal to or more than 0), said calculation of the number of appearance of said event set pair <X,Y> being executed by updating a set of events $NB_q$ occurred between a time $t_{p+1}$ and a time $t_q$ ($p<q\leq m(p)$, $m(p)$ is a natural number), and by updating a set of events $H_q$ which satisfy said sequence condition and are contained in a fourth event set $E'(=\{e_{e1},e_{e2},\ldots,e_{en},\ldots\}$, $e_{en}$ indicates an event) occurred at a time $t_q$ ($p<q<m(p)$) and in optional events at the time $t_{p+1}$, with reference to a local list which is a part of the event list (event list at times $t_p$, $t_{p+1}$, $\ldots$, $t_{m(p)}$, $t_{m(p)}<t_p+w<t_{m(p)+1}$) and updated by said sorter means.

7. A causality detection apparatus for detecting causality of events based upon a database provided with log of the events, comprising:
   a sorter means for generating an event list by sorting in time sequence the events;
   a frequency analysis means for calculating, based upon said event list, the number of appearances of an event pair of a first event and a second event, the number of appearance of the said first event and the number of appearances of said second event, said second event occurring within a predetermined time period after a time of occurrence of said first event; and
   a causality detection means for detecting, based upon the number of appearances of said event pair, upon the number of appearances of said first event and upon the number of appearances of said second event, significance of causality caused by said first event and said second event set occuring within said predetermined time period.

8. The apparatus as claimed in claim 7, wherein said frequency analysis means includes means for calculating said numbers during intermediate period between a time of occurrence of said first event and a time of occurrence of said second event when none of said first and second events is occurring.

9. The apparatus as claimed in claim 7, wherein said causality detection means includes means for calculating, with respect to each event pair, the values of information criteria of two models based upon log likelihoods of the models and upon the number of parameters used in the models, one of said models postulating the existence of causality and the other one of said models postulating no existence of causality, and decision means for detecting significance of causality by comparing the calculated values of information criteria.

10. The apparatus as claimed in claim 9, wherein said decision means decides that there exists significance of causality when the calculated value of information criteria of the model which postulates the existence of causality is smaller than the calculated value of information criteria of the model which postulates no existence of causality.

11. The apparatus as claimed in claim 7, wherein said sorter means includes means for generating a local list which is a part of said event list, and means for generating an event list by updating in inverse time sequence said local list.

12. The apparatus as claimed in claim 7, wherein said frequency analysis means includes means for calculating the number of appearance of an event pair $<e_x,e_y>$ of a first event $e_x$ occurred at a time $t_i$ (i is an integer equal to or more than 0) and a second event $e_y$ occurred at a time $t_k$ ($t_i<t_k<t_i+w$, i and k are integers equal to or more than 0, w is said predetermined time period) in said event list, said event pair $<e_x,e_y>$ satisfying a sequence condition of $e_x \neq e_z$ and $e_y \neq e_z$ with respect to said first event $e_x$, said second event $e_y$ and a third event $e_z$ occurred at an optional time $t_j$ which satisfies $t_i<t_j<t_k$ (j is an integer equal to or more than 0), said calculation of the number of appearance of said event pair $<e_x,e_y>$ being executed by updating a set of events $NB_q$ occurred between a time $t_{p+1}$ and a time $t_q$ ($p<q\leq m(p)$, $m(p)$ is a natural number), and by updating a set of events $H_q$ which satisfy said sequence condition and are contained in a fourth event $e_e$ occurred at a time $t_q$ ($p<q<m(p)$) and in optional events at the time $t_{p+1}$, with reference to a local list which is a part of the event list (event list at times $t_p,t_{p+1}$, $\ldots,t_{m(p)}$, $t_{m(p)}<t_p+w<t_{m(p)+1}$) and updated by said sorter means.

13. A causality detection method for detecting causality of events based upon a database provided with log of the events, said method comprising:
   a sorting step of generating an event list by sorting in time sequence the events;
   a frequency analysis step of calculating, based upon said event list, the number of appearances of an event set pair of a first event set and a second event set, the number of appearances of said first event set and the number of appearances of said second event set, said second event set occurring within a predetermined time period after a time of occurrence of said first event set; and
   a causality detection step of detecting, based upon the number of appearances of said event set pair, upon the number of appearances of said first event set and upon the number of appearances of said second event set, significance of causality caused by said first event and said second event set occuring within said predetermined time period.

14. The method as claimed in claim 13, wherein said frequency analysis step includes a step of calculating said numbers during intermediate period between a time of occurrence of said first event set and a time of occurrence of said second event set when none of said first and second event sets is occurring.

15. The method as claimed in claim 13, wherein said frequency analysis step includes a step of calculating, with respect to each event set pair, the values of information criteria of two models based upon log likelihoods of the models and upon the number of parameters used in the models, one of said models postulating the existence of causality and the other one of said models postulating no existence of causality, and a decision step of detecting significance of causality by comparing the calculated values of information criteria.

16. The method as claimed in claim 15, wherein said decision step decides that there exists significance of causality when the calculated value of information criteria of the model which postulates the existence of causality is smaller than the calculated value of information criteria of the model which postulates no existence of causality.

17. The method as claimed in claim 13, wherein said sorting step includes a step of generating a local list which is a part of said event list, and a step of generating an event list by updating in inverse time sequence said local list.

18. The method as claimed in claim 13, wherein said frequency analysis step includes a step of calculating the number of appearance of an event set pair <X,Y> of a first event set $X(=\{e_{x1},e_{x2}, \ldots ,e_{xn}, \ldots \}$, $e_{xn}$ indicates an event and n is a natural number) occurred at a time $t_i$ (i is an integer equal to or more than 0) and a second event set $Y(=\{e_{y1},e_{y2}, \ldots ,e_{yn}, \ldots \}$, $e_{yn}$ indicates an event) occurred at a time $t_k$ ($t_i<t_k<t_i+w$, i and k are integers equal to or more than 0, w is said predetermined time period) in said event list, said event set pair <X,Y> satisfying a sequence condition of $\forall e_x \in X$, $e_y \in Y$, $e_z \in Z$, $e_x \neq e_z$ and $e_y \neq e_z$ with respect to said first event set X, said second event set Y and a third event set $Z(=\{e_{z1},e_{z2}, \ldots ,e_{zn}, \ldots \}$, $e_{zn}$ indicates an event) occurred at an optional time $t_j$ which satisfies $t_i<t_j<t_k$ (j is an integer equal to or more than 0), said calculation of the number of appearance of said event set pair <X,Y> being executed by updating a set of events $NB_q$ occurred between a time $t_{p+1}$ and a time $t_q$ ($p<q \leq m(p)$, m(p) is a natural number), and by updating a set of events $H_q$ which satisfy said sequence condition and are contained in a fourth event set E' $(=\{e_{e1},e_{e2}, \ldots ,e_{en}, \ldots \}$, $e_{en}$ indicates an event) occurred at a time $t_q$ ($p<q<m(p)$) and in optional events at the time $t_{p+1}$, with reference to a local list which is a part of the event list (event list at times $t_p,t_{p+1}, \ldots ,t_{m(p)}$, $t_{m(p)}<t_p+w<t_{m(p)+1}$) and updated at said sorting step.

19. A causality detection method for detecting causality of events based upon a database provided with log of the events, comprising:

a sorting step of generating an event list by sorting in time sequence the events;

a frequency analysis step of calculating, based upon said event list, the number of appearances of an event pair of a first event and a second event, the number of appearance of the said first event and the number of appearance of said second event, said second event occurring within a predetermined time period after a time of occurrence of said first event; and a causality detection step of detecting, based upon the number of appearance of said event pair, upon the number of appearances of said first event and upon the number of appearances of said second event, significance of causality caused by said first event and said second event set occuring within said predetermined time period.

20. The method as claimed in claim 19, wherein said frequency analysis step includes a step of calculating said numbers during intermediate period between a time of occurrence of said first event and a time of occurrence of said second event when none of said first and second events is occurring.

21. The method as claimed in claim 19, wherein said causality detection step includes a step of calculating, with respect to each event pair, the values of information criteria of two models based upon log likelihoods of the models and upon the number of parameters used in the models, one of said models postulating the existence of causality and the other one of said models postulating no existence of causality, and a decision step of detecting significance of causality by comparing the calculated values of information criteria.

22. The method as claimed in claim 21, wherein said decision step decides that there exists significance of causality when the calculated value of information criteria of the model which postulates the existence of causality is smaller than the calculated value of information criteria of the model which postulates no existence of causality.

23. The method as claimed in claim 19, wherein said sorting step includes a step of generating a local list which is a part of said event list, and a step of generating an event list by updating in inverse time sequence said local list.

24. The method as claimed in claim 19, wherein said frequency analysis step includes a step of calculating the number of appearance of an event pair $<e_x,e_y>$ of a first event $e_x$ occurred at a time $t_i$ (i is an integer equal to or more than 0) and a second event $e_y$ occurred at a time $t_k$ ($t_i<t_k<t_i+w$, i and k are integers equal to or more than 0, w is said predetermined time period) in said event list, said event pair $<e_x,e_y>$ satisfying a sequence condition of $e_x \neq e_z$ and $e_y \neq e_z$ with respect to said first event $e_x$, said second event $e_y$ and a third event $e_z$ occurred at an optional time $t_j$ which satisfies $t_i<t_j<t_k$ (j is an integer equal to or more than 0), said calculation of the number of appearance of said event pair $<e_x,e_y>$ being executed by updating a set of events $NB_q$ occurred between a time $t_{p+1}$ and a time $t_q$ ($p<q$ $m(p)$, m(p) is a natural number), and by updating a set of events $H_q$ which satisfy said sequence condition and are contained in a fourth event $e_e$ occurred at a time $t_q$ ($p<q<m(p)$) and in optional events at the time $t_{p+1}$, with reference to a local list which is a part of the event list (event list at times $t_p,t_{p+1}, \ldots ,t_{m(p)}$, $t_{m(p)}<t_p+w<t_{m(p)+1}$) and updated at said sorting step.

* * * * *